(12) United States Patent
Cui et al.

(10) Patent No.: US 8,339,550 B2
(45) Date of Patent: Dec. 25, 2012

(54) LIQUID CRYSTAL DISPLAY PANEL AND METHOD FOR PRODUCING THE SAME

(75) Inventors: Hongqing Cui, Kunshan (CN); Te-Chen Chung, Kunshan (CN)

(73) Assignee: Infovision Optoelectronics (Kunshan) Co., Ltd., Kunshan (CN)

( * ) Notice: Subject to any disclaimer, the term of this patent is extended or adjusted under 35 U.S.C. 154(b) by 664 days.

(21) Appl. No.: 12/560,392

(22) Filed: Sep. 15, 2009

(65) Prior Publication Data

US 2011/0019139 A1 Jan. 27, 2011

(30) Foreign Application Priority Data

Jul. 24, 2009 (CN) .......................... 2009 1 0161219

(51) Int. Cl.
*G02F 1/1333* (2006.01)
*G02F 1/1335* (2006.01)
(52) U.S. Cl. ........... 349/138; 349/43; 349/107; 349/109
(58) Field of Classification Search .................... 349/43, 349/106–107, 138, 109
See application file for complete search history.

(56) References Cited

U.S. PATENT DOCUMENTS 7,782,416 B2 * 8/2010 Seo et al. .................... 349/47
2010/0123862 A1 * 5/2010 Hsu et al. .................... 349/114

* cited by examiner

*Primary Examiner* — Nathanael R Briggs
(74) *Attorney, Agent, or Firm* — Perkins Coie LLP; Aaron Wininger

(57) ABSTRACT

Embodiments of the present invention provide a Liquid Crystal Display (LCD) panel, including an upper substrate and a lower substrate between which a liquid crystal layer is sealed. The lower substrate includes a plurality of sub-pixel regions arranged in regular patterns. The upper substrate includes Black Matrixes (BM) and an upper transparent conductive layer which are formed in sequence on the bottom surface of an upper transparent substrate. The lower substrate includes a first metal layer, a dielectric layer, a second metal layer, an organic layer, a first insulation layer, a third metal layer, a second insulation layer, a fourth metal layer, a passivation layer and a lower transparent conductive layer which are deposited in sequence on the upper surface of a lower transparent substrate. Embodiments of the present invention also provide a method for producing the LCD panel.

5 Claims, 8 Drawing Sheets

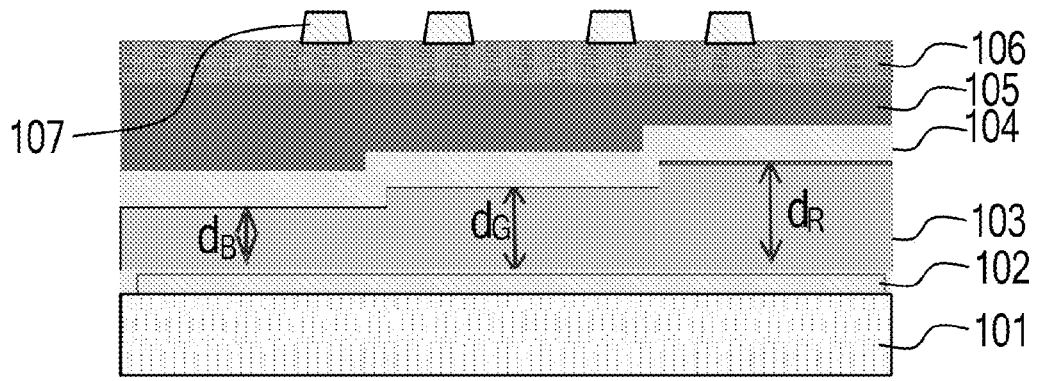
Figure 3a
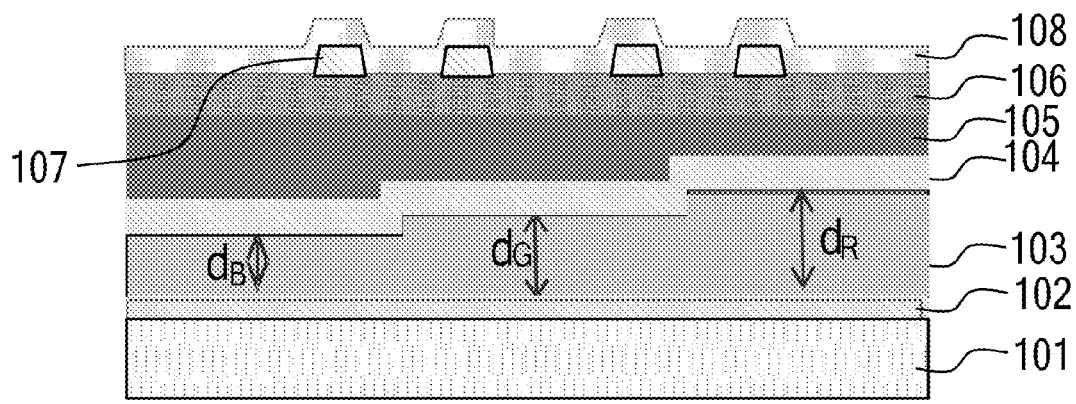
Figure 3b
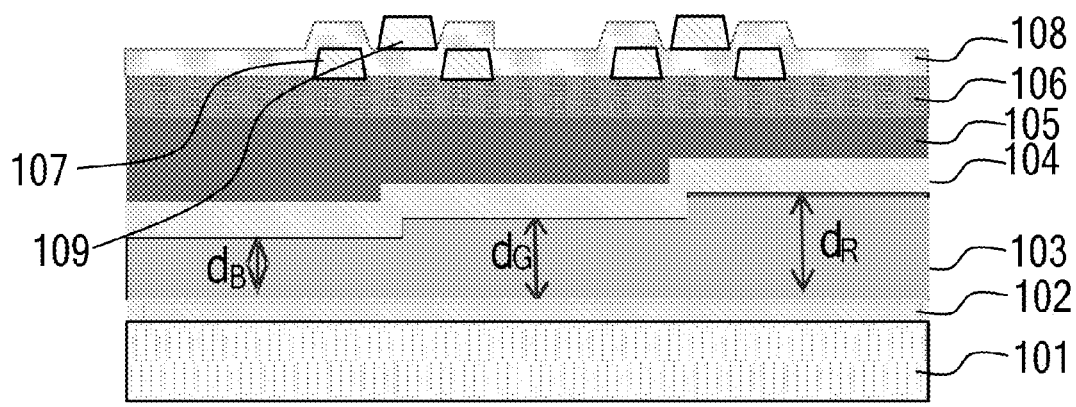

Figure 3f
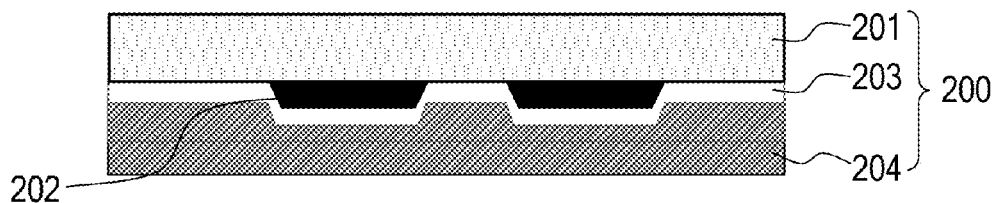
Figure 3g
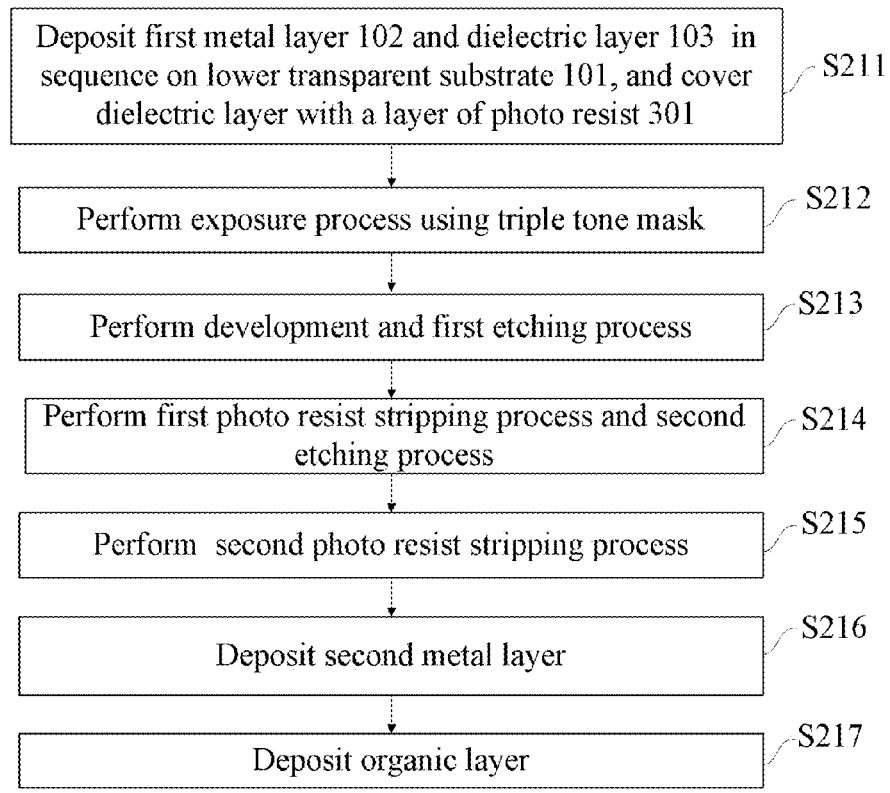
Figure 4

LIQUID CRYSTAL DISPLAY PANEL AND METHOD FOR PRODUCING THE SAME

CROSS-REFERENCE TO RELATED APPLICATION

This application claims priority to and expressly incorporates by reference Chinese patent application No. 200910161219.9 filed Jul. 24, 2009.

FIELD OF THE INVENTION

The present invention relates to liquid crystal display technology, and more particularly to a Liquid Crystal Display (LCD) panel and a method for producing the LCD panel.

BACKGROUND

A Liquid Crystal Display (LCD) has many advantages such as being thin and light, energy efficient and radiationless, and therefore, it has gradually replaced conventional Cathode Ray Tube (CRT) displays. Currently, LCDs are widely used in various electronic devices, such as high resolution digital televisions, desktop computers, Personal Digital Assistants (PDAs), laptop computers, mobile telephones, digital cameras, etc.

The conventional LCD device consists of a LCD panel and a liquid crystal module. The LCD panel itself emits no light, and needs a backlight component configured in the liquid crystal module as a light source to illuminate the LCD panel for displaying. The LCD panel consists of an array substrate, a Color Filter (CF) substrate opposite thereof, and a liquid crystal layer sealed between the two substrates. The array substrate has a Thin Film Transistor (TFT) formed by a plurality of films, and the CF substrate has red (R), green (G) and blue (B) color filters arranged in regular patterns which are made from color resist.

During a conventional process for producing a LCD panel, the process for producing the array substrate usually includes: film deposition, exposure, development, etching, color resist stripping, etc., which are repeated for five times to form film structures including a gate insulation layer, thin film transistors, a passivation layer, through holes and a transparent conductive layer. Correspondingly, the process for producing the CF substrate usually includes five steps in sequence as follows: forming R filters, forming G filters, forming B filters, forming Black Matrixes (BMs) and forming a transparent conductive layer. In the above conventional process for producing a LCD panel, some steps are repeated many times, which is time-consuming and costly, and has limited the production efficiency of the LCD panel. For example, in the conventional process for producing the CF substrate in the LCD panel, the steps of forming the R filters, the G filters and the B filters need three different masks which are costly, and as a result, the production costs of the LCD panel made through the conventional process are high.

SUMMARY

According to an embodiment of the present invention, a Liquid Crystal Display (LCD) panel includes:
an upper substrate and a lower substrate, and a liquid crystal layer sealed between the upper substrate and the lower substrate;
wherein the lower substrate comprises a plurality of sub-pixel regions arranged in regular patterns, and the upper substrate comprises Black Matrixes and an upper transparent conductive layer which are formed in sequence on a bottom surface of an upper transparent substrate;
the lower substrate further comprises a first metal layer, a dielectric layer, a second metal layer, an organic layer, a first insulation layer, a third metal layer, a second insulation layer, a fourth metal layer, a passivation layer and a lower transparent conductive layer which are deposited in sequence on an upper surface of a lower transparent substrate.

According to another embodiment of the present invention, a method for producing the LCD panel described above includes: forming an upper substrate and a lower substrate, sealing a liquid crystal layer between the upper substrate and the lower substrate, wherein the lower substrate comprises multiple sub-pixel regions arranged in regular patterns;
wherein the forming the upper substrate comprises:
forming Black Matrixes on a bottom surface of an upper transparent substrate of the LCD panel; and
forming an upper transparent conductive layer on the Black Matrixes and parts of the bottom surface of the upper transparent substrate;
wherein the forming the lower substrate comprises:
depositing a first metal layer, a dielectric layer, a second metal layer and an organic layer in sequence on an upper surface of a lower transparent substrate of the LCD panel;
depositing a first insulation layer and a third metal layer in sequence on a surface of the organic layer;
depositing a second insulation layer on a surface of the third metal layer;
depositing a fourth metal layer on a surface of the second insulation layer;
depositing a passivation layer on a surface of the fourth metal layer; and
depositing a lower transparent conductive layer on a surface of the passivation layer.

According to another embodiment of the present invention, a method for forming an array substrate includes:
arranging a plurality of sub-pixel regions in regular patterns in the lower substrate,
depositing a first metal layer, a dielectric layer, a second metal layer and an organic layer in sequence on an upper surface of a transparent substrate;
depositing a first insulation layer and a third metal layer in sequence on a surface of the organic layer;
depositing a second insulation layer on a surface of the third metal layer;
depositing a fourth metal layer on a surface of the second insulation layer;
depositing a passivation layer on a surface of the fourth metal layer; and
depositing a transparent conductive layer on a surface of the passivation layer.

Through incorporating the interference filter in the lower substrate to replace the color filters in the conventional LCD panel, a color display effect is achieved. The interference filter includes the first metal layer, the dielectric layer, the color filter, the second metal layer and the organic layer which are deposited in sequence on the lower substrate. Further, the process for producing the interference filter may be incorporated in the process for producing the lower substrate, and thus save the processes for producing the conventional R filter, the G filter and the B filter in sequence. Therefore, the whole production process may be simplified and the production efficiency of the LCD panel may be greatly improved.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIGS. 3a to 3g are schematic diagrams illustrating a production process of the LCD panel according to the embodiment of the present invention after an interference filter is produced.

FIG. 4 is a flowchart illustrating a method for producing the interference filter in the LCD panel according to the embodiment of the present invention.

DETAILED DESCRIPTION OF EMBODIMENTS

Exemplary embodiments will be described in detail in the following with reference to the drawings.

Figure 1:
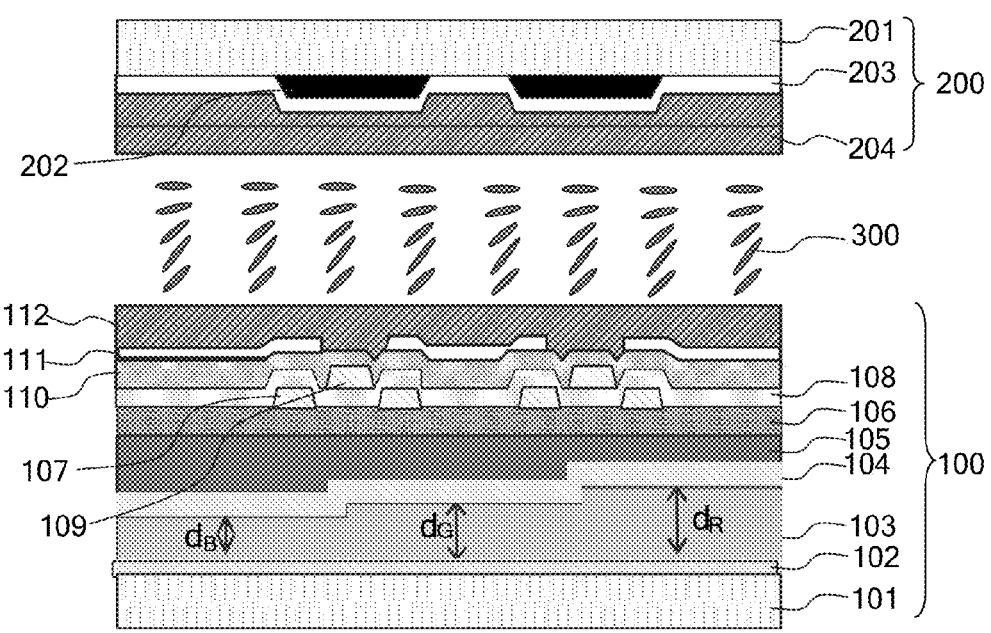
FIG. 1 is a cross sectional view of a LCD panel according to an embodiment of the present invention.

FIG. 1 is a cross sectional view of a LCD panel according to an embodiment of the present invention. The LCD panel includes: an upper substrate 200 and a lower substrate 100 opposite thereof, and a liquid crystal layer 300 sealed between the two substrates. The lower substrate (also called "the array substrate") 100 has a plurality of sub-pixel regions arranged in regular patterns thereon. In an embodiment of the present invention, for clarity, one of pixel regions on the lower substrate 100 is illustrated, which includes R, G and B sub-pixel regions arranged in regular patterns. The lower substrate 100 includes: a lower transparent substrate 101, an interference filter formed on the lower transparent substrate 101 and film structures above the interference filter. The interference filter includes a first metal layer 102 on the upper surface of the lower transparent substrate 101, a dielectric layer 103 covering the upper surface of the first metal layer 102, a second metal layer 104 covering the upper surface and side walls of the dielectric layer 103, and an organic layer 105 covering the upper surface and side walls of the second metal layer 104. The depths of the dielectric layer 103 corresponding to the R sub-pixel region, the G sub-pixel region and the B sub-pixel region respectively are different from each other. The film structures cover the organic layer 105, for more detail, include, from bottom to top, a first insulation layer 106, a storage capacitor electrode line 107 as well as gate lines and a gate electrode of a thin film transistor, a second insulation layer 108, data lines 109 as well as a source electrode, a drain electrode and active areas of the thin film transistor (not shown in FIG. 1), a passivation layer 110 and a through hole (not shown in FIG. 1) therein, a lower transparent conductive layer 111 which is electrically connected to the drain electrode of the thin film transistor via the through hole in the passivation layer 110, and a lower alignment layer 112. The upper substrate 200 includes: an upper transparent substrate 201, a Black Matrix 202 under the bottom surface of the upper transparent substrate 201, an upper transparent conducting layer 203 covering the bottom surface and side walls of the Black Matrix 202 as well as parts of the bottom surface of the upper transparent substrate 201, and an upper alignment layer 204 covering the bottom surface and the side walls of the upper transparent conducting layer 203.

With reference to FIG. 1, the first metal layer 102 may be made from any metal materials which have a uniformly-distributed reflectance in the visible spectrum and a low absorption coefficient, such as germanium, molybdenum, nickel, niobium, platinum, tungsten, etc. The depth of the first metal layer 102 may be 10~30 nanometers. The dielectric layer 103 covering the upper surface of the first metal layer 102 is made from dielectric materials with a low refraction index and a low absorption coefficient. For example, the dielectric layer 103 in this embodiment is made from $SiO_2$, which has a refraction index of 1.45 and an absorption coefficient approaching 0. When light travels vertically, it transits the lower transparent substrate 101, and then the first metal layer 102 as well as the second metal layer 104, as a result of double reflections, the optical paths difference of the light beams (represented by δ) is calculated with the following formula:

$$\delta = 2nd \quad (1),$$

wherein n represents the refraction index of the dielectric layer 103 and d represents the depth thereof. As to a light beam with the wavelength of λ:

$$\delta = m\lambda, (m=1, 2, 3 \ldots) \quad (2),$$

so it can be deduced from Formulas (1) and (2) that the depth of the dielectric layer 103 is:

$$d = \frac{m\lambda}{2n}. \quad (3)$$

In order to obtain red (R), green (G) and blue (B) color lights respectively from the light beams transmitting the interference filter, the ratio of the depths of different parts of the dielectric layer 103 which correspond to the R, G and B sub-pixel regions respectively is identical to the ratio of the wavelengths of the red, green and blue lights, i.e. $d_R:d_G:d_B = \lambda_R:\lambda_G:\lambda_B$, where $d_R$, $d_G$ and $d_B$ represent the depths of different parts of the dielectric layer 103 which correspond to the R, G and B sub-pixel regions respectively, and $\lambda_R$, $\lambda_G$ and $\lambda_B$ represent the wavelengths of the red, green and blue lights respectively.

According to an embodiment of the present invention, a Cold Cathode Fluorescent Lamp (CCFL) is taken as an example of the backlight that illuminates the LCD panel. For example, when light travels vertically, the corresponding wavelengths of red, green and blue lights at corresponding transmissivity peaks are approximately $\lambda_R$=610 nanometers, $\lambda_G$=543 nanometers and $\lambda_B$=440 nanometers respectively. According to the embodiment of the LCD panel, in Formula (3) the optimum value of m may be 1, so the depths of the parts of the dielectric layer 103 which correspond to the R, G and B sub-pixel regions are different respectively, i.e., $d_R$=about 210 nanometers, $d_G$=about 187 nanometers and $d_B$=about 152 nanometers. Lights of other wavelengths in the backlight spectrum can be blocked from mixing into the obtained R, G and B light beams corresponding to the R, G and B sub-pixel regions, and thereby ensuring purities thereof respectively.

The second metal layer 104 covers the upper surface and the side walls of the dielectric layer 103 with different depths in different parts. The second metal layer 104 may be made from any metal materials which have a uniformly-distributed reflectance in the visible spectrum and a low absorption coefficient, such as germanium, molybdenum, nickel, niobium, platinum, tungsten, etc. The depth of the second metal molybdenum, nickel, niobium, platinum, tungsten, etc. The depth of the second metal layer 104 may be about 10 to about 30 nanometers. Then the organic layer 105 with a flat upper surface covers the upper surface and the side walls of the second metal layer 104.

In the embodiment of the present invention, the interference filter is incorporated in the array substrate of the LCD panel, so that the color filters of the conventional LCD panel are replaced, while still achieving color display. Furthermore, a process for producing the interference filter may be also incorporated in the process for producing the array substrate, as a result the production process of the conventional color filters can be left out.

Figure 2:
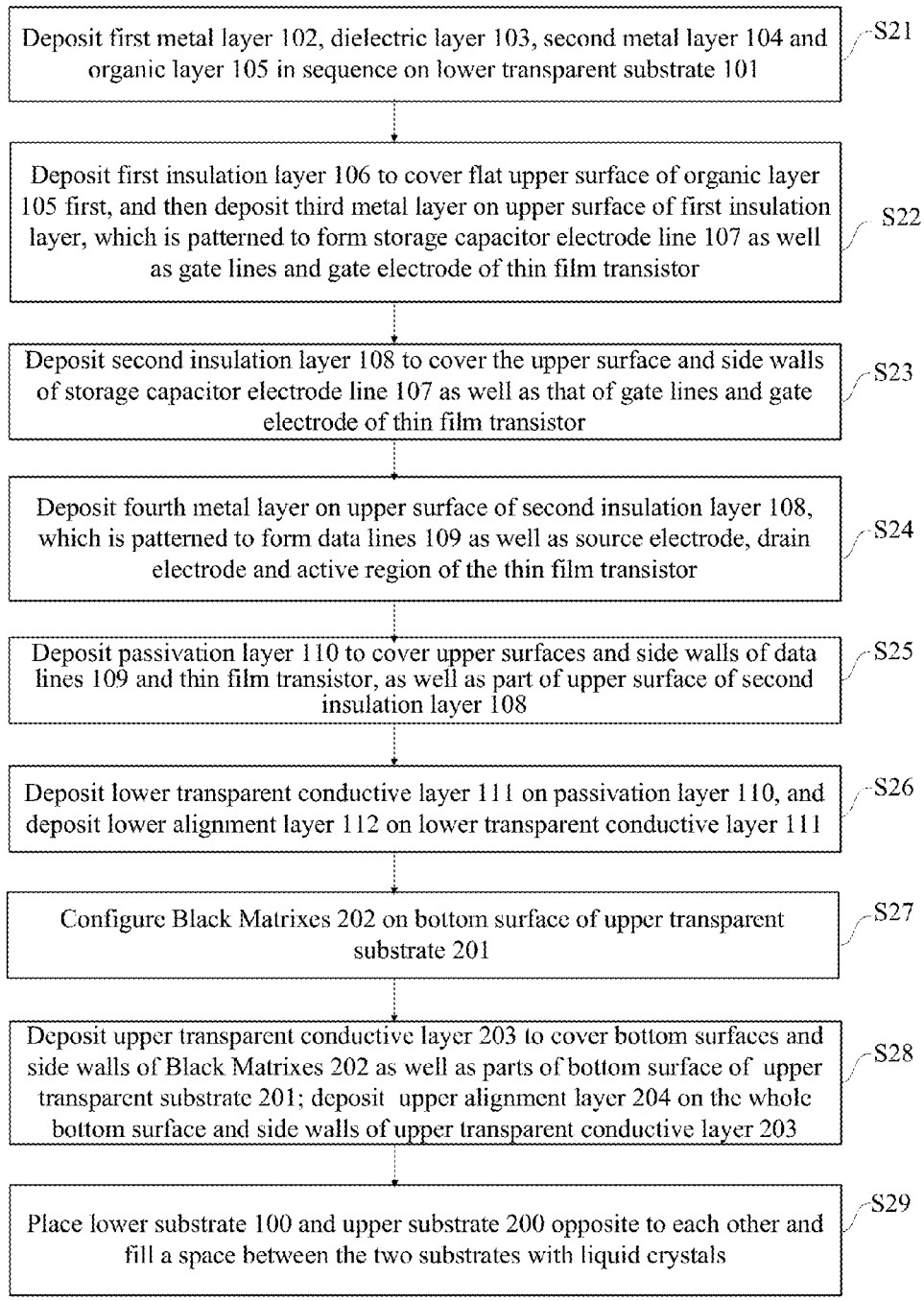
FIG. 2 is a flowchart illustrating a method for producing the LCD panel according to an embodiment of the present invention.

FIG. 2 is a flowchart illustrating a method for producing the LCD panel according to the embodiment of the present invention, and FIGS. 3a to 3g are schematic diagrams illustrating a production process of the LCD panel according to the embodiment of the present invention after an interference filter is produced. Hereinafter, the production process of the LCD panel in accordance with the embodiment of the present invention is described with reference to FIG. 2 and FIGS. 3a~3g.

As shown in FIG. 2, at S21, a first metal layer 102, a dielectric layer 103, a second metal layer 104 and an organic layer 105 are deposited in sequence on a lower transparent substrate 101. The process of S21 will be described in detail with reference to FIG. 4 and FIGS. 5a~5g, wherein FIG. 4 is a flowchart illustrating a method for producing the interference filter in the LCD panel according to the embodiment of the present invention as well as FIGS. 5a to 5g are schematic diagrams illustrating a production process of the interference filter in the LCD panel according to the embodiment of the present invention.

At S211 (FIG. 4 and FIG. 5a), the first metal layer 102 and the dielectric layer 103 are deposited in sequence on the lower transparent substrate 101, and the dielectric layer 103 is covered with a layer of photo resist 301.

Figure 5A:
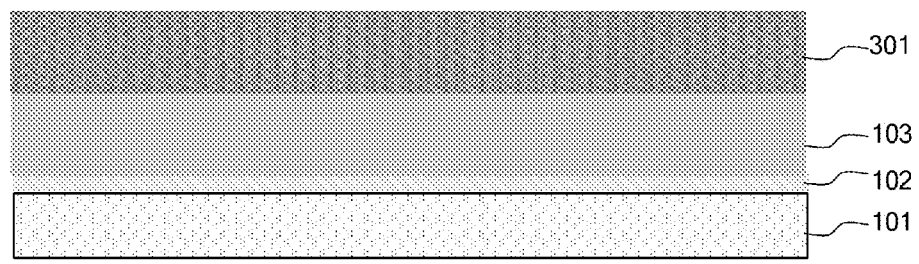
FIGS. 5a to 5g are schematic diagrams illustrating a production process of the interference filter in the LCD panel according to the embodiment of the present invention.

As shown in FIG. 5a, the lower transparent substrate 101 is provided first; then the first metal layer 102 and the dielectric layer 103 are deposited in sequence on the upper surface of the lower transparent substrate 101. The first metal layer 102 and the dielectric layer 103 may be deposited by a conventional vapor deposition technique, such as Plasma Enhanced Chemical Vapor Deposition (PECVD) or sputtering deposition. Furthermore, the depth of the first metal layer 102 is about 10 to about 30 nanometers. The first metal layer 102 may be made from germanium, molybdenum, nickel, niobium, platinum, tungsten, etc. The dielectric layer 103 may be made from SiO2. Then the layer of photo resist 301 is coated on the upper surface of the dielectric layer 103 by a conventional photo resist coating technique. The photo resist 301 in the embodiment is positive photo resist.

At S212 (FIG. 4 and FIG. 5b), a triple tone mask is used in an exposure process.

Figure 5B:
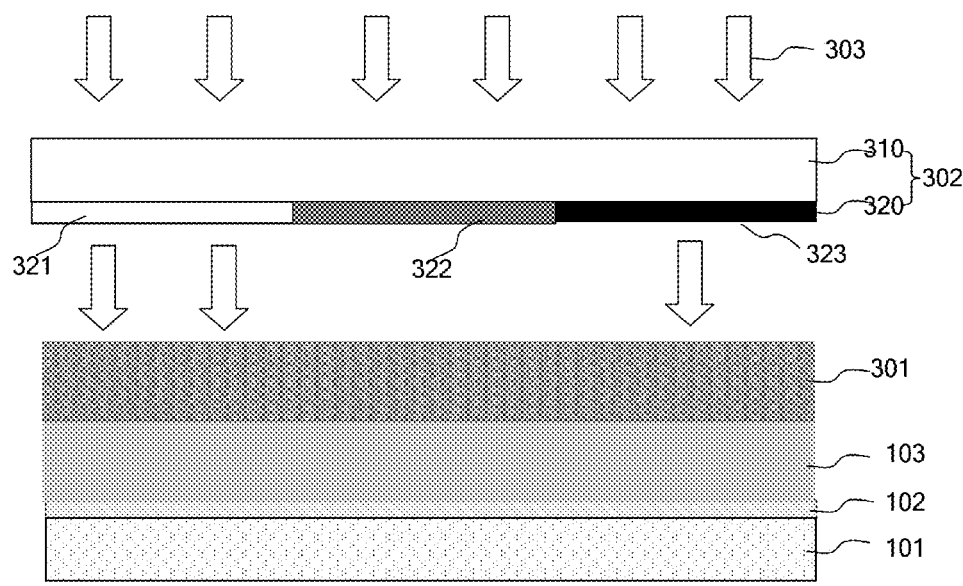

As shown in FIG. 5b, the mask used in the exposure process is a triple tone mask 302, which includes a beam sensitive layer 310 and an exchange layer 320. For example, the beam sensitive layer 310 may be made of the high energy beam sensitive glass or the laser direct writing glass. In this embodiment, the laser direct writing glass is taken as an example for exemplarily illustrating. The exchange layer 320 is a color silver (short for Ag) granules layer with the depth of about 1 to about 3 μm. When the exchange layer 320 is exposed to a laser beam, the Ag granules experience a thermal chemical reaction in which the Ag granules are turned into Ag ions, and the transparency of the triple tone mask 302 is thus changed. The intensity of the laser affects the quantity of the Ag granules which are turned into the Ag ions, resulting in different levels of transparency of the triple tone mask 302. As shown in FIG. 5b, the triple tone mask 302 is divided into three regions based on the different levels of transparency per se, i.e., a first region 321, a second region 322 and a third region 323. The first region 321, the second region 322 and the third region 323 correspond to the B, G and R sub-pixel regions in a pixel region on the array substrate respectively. Then, a conventional exposure technique is used, e.g., UV Light 303 is vertically transmitted onto the triple tone mask 302. As a result of transmitting through the different regions with different levels of transparency, the UV light shines on the upper surface of the layer of photo resist 301 with different intensity.

At S213 (FIG. 4 and FIG. 5c), a development process and a first etching process are performed.

Figure 5C:
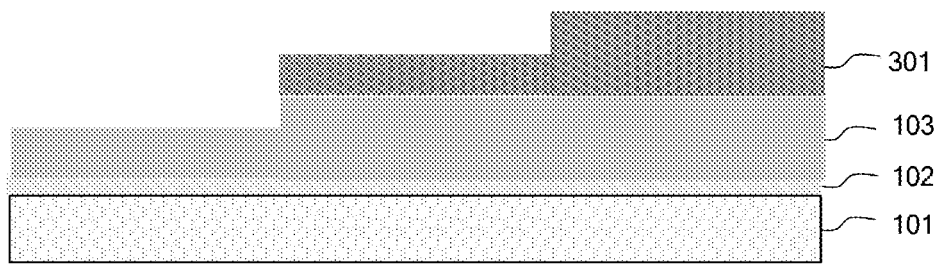

As shown in FIG. 5c, after the exposure process, the UV light with different intensity shines on the upper surface of the layer of photo resist 301 vertically and thereby different parts of the layer of photo resist 301 are affected with the UV light to different extents. According to a conventional development technique, the part of the layer of photo resist 301 corresponding to the first region 321 which in turn corresponds to the B sub-pixel region is dissolved completely, and other parts of the layer of photo resist 301 respectively corresponding to the second region 322 and the third region 323 are at different depths.

After the development process, the first etching process is applied to the dielectric layer 103 through, for example, a conventional dry etching technology. The part of the dielectric layer 103 corresponding to the first region (as shown in FIG. 5c) is not covered by the layer of photo resist 301, which is etched by a depth of $(d_G - d_B)$ and the depth of the remaining dielectric layer in this part is $d_R - (d_G - d_B)$ as a result.

At S214 (FIG. 4 and FIG. 5d), a first photo resist stripping process and a second etching process are performed.

After the first etching process, the layer of photo resist 301 is subject to a first stripping process through a conventional photo resist stripping technique, for example the ozone-based stripping technique. Thereby, the part of the layer of photo resister 301 corresponding to the second region 322 which corresponds to the G sub-pixel region is stripped completely and the part of the photo resist 301 corresponding to the third region 323 which corresponds to the R sub-pixel region is partially stripped. Finally, as shown in FIG. 5d, the part of the dielectric layer 103 corresponding to the second region 322 is not covered with the photo resist 301, while the part of the dielectric layer 103 corresponding to the third region 323 is still covered with the photo resist 301.

Figure 5D:
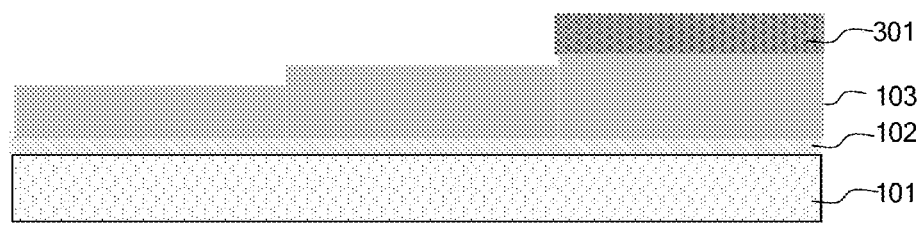

As shown in FIG. 5d, after the first photo resist stripping process, similarly to S231, the conventional dry etching technology is applied again. Because the part of the dielectric layer 103 corresponding to the second region 322 which in turn corresponds to the G sub-pixel region that is not covered with the photo resist 301, which is etched by a depth of $(d_R - d_G)$ and the depth of the remainder is $d_R - (d_R - d_G) = d_G$. Hence the depth of the dielectric layer 103 corresponding to the second region 322, which in turn, corresponds to the G sub-pixel region is $d_G$.

In the second etching process, the part of the dielectric layer 103 corresponding to the first region which in turn corresponds to the B sub-pixel region is subjected to a second etching by a depth of $(d_R - d_G)$. After the two etching processes, the remaining depth of the dielectric layer 103 corresponding to the first region is $d_R - (d_G - d_B) - (d_R - d_G) = d_B$, that is, the depth of the dielectric layer 103 corresponding to the B sub-pixel region is $d_B$.

At S215 (FIG. 4 and FIG. 5e), a second photo resist stripping process is performed.

Figure 5E:
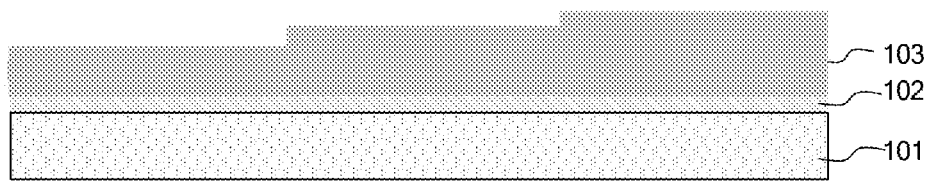

As shown in FIG. 5e, after the second etching process, similar to S214, a conventional photo resist stripping technique, for example, an ozone-based stripping technique, is used to completely strip the part of the layer of photo resist 301 corresponding to the third region 323. Consequently, as shown in FIG. 5e, the part of the dielectric layer 103 corresponding to the third region is not covered with the photo resist and the depth of the part of the dielectric layer 103 corresponding to the third region is $d_R$, in turn, the depth of the dielectric layer 103 corresponding to the R sub-pixel region is $d_R$.

At S216 (FIG. 4 and FIG. 5f), the second metal layer is deposited.

Figure 5F:
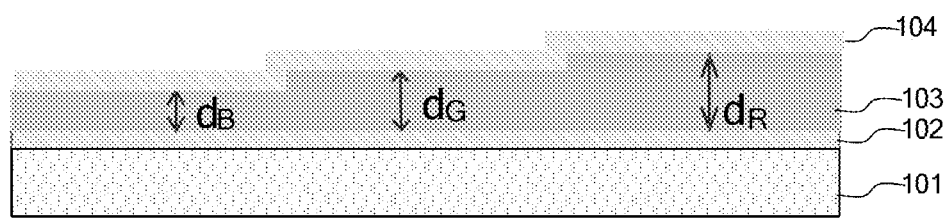

As shown in FIG. 5f, after the second photo resist stripping process, the dielectric layer 103 has three different regions at three different depths, i.e., the depths of $d_R$, $d_G$ and $d_B$ corresponding to the R sub-pixel region, the G sub-pixel region and the B sub-pixel region respectively, and $d_B < d_G < d_R$. Obviously, when the R, G and B sub-pixel regions are arranged in a different sequence, the depths of different parts of the dielectric layer 103 may be arranged in a different way accordingly.

Then, the second metal layer 104 is deposited to cover the upper surfaces and side walls of the different parts of the dielectric layer 103 which correspond to the R, G and B sub-pixel regions respectively. Furthermore, the second metal layer 104 may be made from materials such as germanium, molybdenum, nickel, niobium, platinum, tungsten, etc. with a depth of about 10 to about 30 nanometers.

At S217 (FIG. 4 and FIG. 5g), the organic layer is deposited.

Figure 5G:
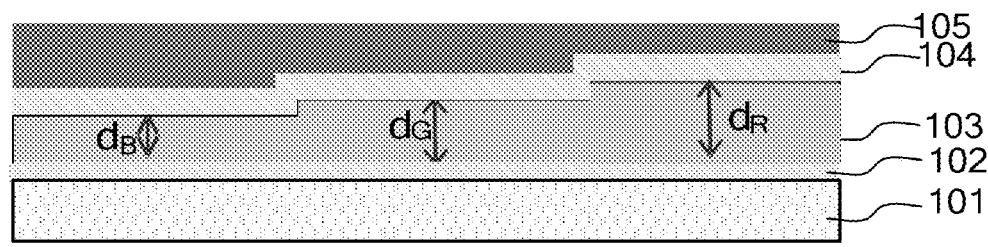

As shown in FIG. 5g, after the process S216, the organic layer 105 is deposited to cover the upper surface and side walls of the second metal layer 104 by a conventional spin coating technique. The upper surface of the organic layer 105 is flat.

The interference filter of the LCD panel in accordance with the embodiment of the present invention, as shown in FIG. 5g, is thus obtained through the processes S211 to S217 above.

At S22, as shown in FIG. 3a, a first insulation layer 106 is deposited to cover the flat upper surface of the organic layer 105 first; then, a third metal layer is deposited on the upper surface of the first insulation layer 106, which is patterned to form a storage capacitor electrode line 107 as well as gate lines and a gate electrode of a thin film transistor (not shown in the drawings).

At S23, as shown in FIG. 3b, a second insulation layer 108 is deposited to cover the upper surface and side walls of the storage capacitor electrode line 107 as well as that of the gate lines and gate electrode of the thin film transistor.

Figure 3C:
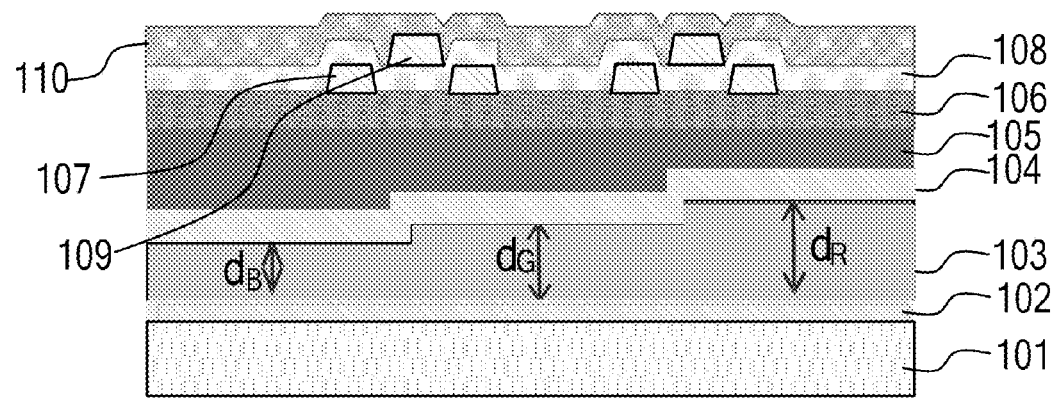

At S24, as shown in FIG. 3c, a fourth metal layer is deposited on the upper surface of the second insulation layer 108, which is patterned to form data lines 109 as well as a source electrode, a drain electrode and an active region of the thin film transistor.

Figure 3D:
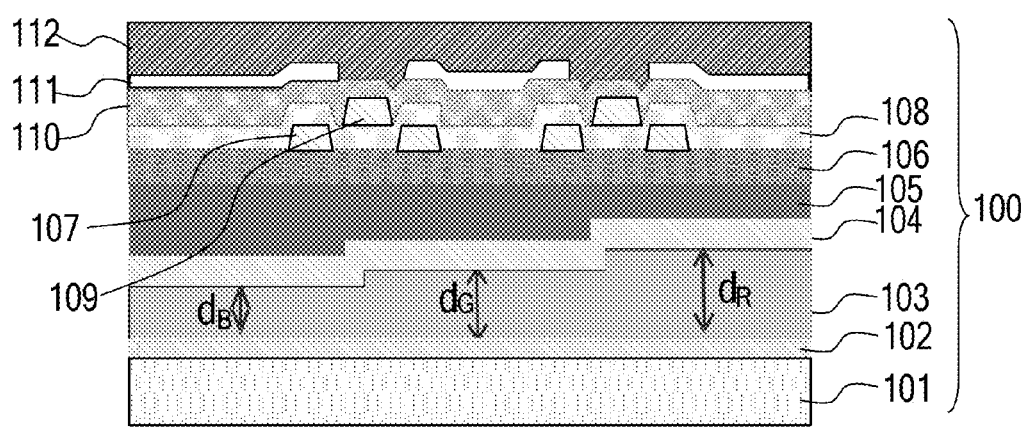

At S25, as shown in FIG. 3d, a passivation layer 110 is deposited to cover the upper surfaces and side walls of the data lines 109 and the thin film transistor, as well as part of the upper surface of the second insulation layer 108. Furthermore, a through hole (not shown in the drawings) is formed in the passivation layer 110.

Figure 3E:
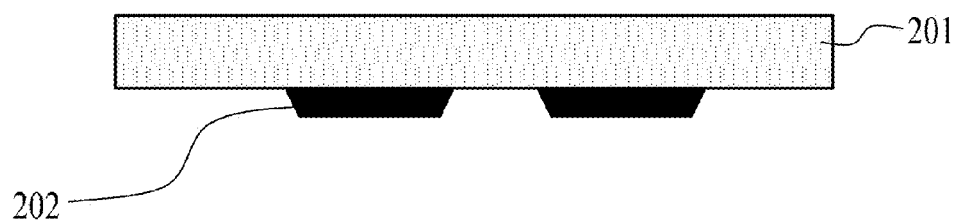

At S26, as shown in FIG. 3e, a lower transparent conductive layer 111 is deposited on the passivation layer 110 and a lower alignment layer 112 is deposited on the lower transparent conductive layer 111. The lower transparent conductive layer 111 is electrically connected to the drain electrode of the thin film transistor via the through hole in the passivation layer 110.

The lower substrate 100 of the LCD panel in accordance with the embodiment of the present invention is thus obtained through the above processes S21 to S26.

At S27, as shown in FIG. 3f, Black Matrixes 202 are configured on the bottom surface of an upper transparent substrate 201.

At S28, as shown in FIG. 3g, an upper transparent conductive layer 203 is deposited to cover the bottom surfaces and side walls of the Black Matrixes 202 as well as parts of the bottom surface of the upper transparent substrate 201; the upper alignment layer 204 is deposited on the whole bottom surface and the side walls of the upper transparent conductive layer 203.

The upper substrate 200 of the LCD panel in accordance with the embodiment of the present invention is thus obtained through the processes S27 to S28 above.

After the above processes, S29 is performed in which the lower substrate 100 and the upper substrate 200 are placed opposite to each other and the space between the two substrates is sealed and filled with a layer of liquid crystal to form a liquid crystal layer 300.

As can be seen from the description above, the method for producing the interference filter on the lower substrate is described in detail from processes S211 to S217. Through incorporating the interference filter into the lower substrate to replace the conventional color filters in the conventional LCD panel, color display effect is thus achieved. Further, the process for producing the interference filter may be incorporated in the process for producing the lower substrate by using only one mask, and thus save steps and masks for producing the conventional R filter, the G filter and the B filter in sequence using three masks. Therefore, the whole production process may be simplified and the production efficiency of the LCD panel may be greatly improved.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A Liquid Crystal Display (LCD) panel, comprising:
an upper substrate and a lower substrate, and a liquid crystal layer sealed between the upper substrate and the lower substrate;
wherein the lower substrate comprises a plurality of sub-pixel regions arranged in regular patterns,
the upper substrate comprises Black Matrixes and an upper transparent conductive layer which are formed in sequence on a bottom surface of an upper transparent substrate;
the lower substrate further comprises a first metal layer, a dielectric layer, a second metal layer, an organic layer, a first insulation layer, a third metal layer, a second insulation layer, a fourth metal layer, a passivation layer and a lower transparent conductive layer which are deposited in sequence on an upper surface of a lower transparent substrate,
the sub-pixel regions comprise Red (R) sub-pixel regions, Green (G) sub-pixel regions and Blue (B) sub-pixel regions,
a ratio of depths of different parts of the dielectric layer which respectively correspond to the R sub-pixel regions, the G sub-pixel regions and the B sub-pixel regions is identical to the ratio of wavelengths of red light, green light and blue light, and the depths of the different parts of the dielectric layer which respectively correspond to the R sub-pixel region, the G sub-pixel region and the B sub-pixel regin are $$d_R = \frac{\lambda_R}{2n}, d_G = \frac{\lambda_G}{2n} \text{ and } d_B = \frac{\lambda_B}{2n}$$

respectively, wherein $\lambda_R$, $\lambda_G$ and $\lambda_B$ are the wavelengths of red light, green light and blue light respectively in a light source and n is a refractive index of the dielectric layer.

2. The LCD panel according to claim 1, wherein the dielectric layer is made from silicon dioxide (SiO2).

3. The LCD panel according to claim 1, wherein the first metal layer or the second metal layer is made from any of germanium, molybdenum, nickel, niobium, platinum and tungsten.

4. The LCD panel according to claim 1, wherein the depth of the first metal layer or the second metal layer is about 10 to about 30 nanometers.

5. The LCD panel according to claim 1, wherein the organic layer has a flat upper surface.

* * * * *